Dec. 13, 1927.　　　　　　　　　　　　　　1,652,375
L. G. SABBAG
MACHINE FOR AUTOMATICALLY ROLLING ARTICLES FROM BLANKS OF PLASTIC MATERIAL
Original Filed March 15, 1922　　4 Sheets-Sheet 1

Fig. 1.

Inventor.
Litfallah G. Sabbag
by Heard Smith Tennant
Attys.

Dec. 13, 1927.

L. G. SABBAG 1,652,375

MACHINE FOR AUTOMATICALLY ROLLING ARTICLES FROM BLANKS OF PLASTIC MATERIAL

Original Filed March 15, 1922    4 Sheets-Sheet 4

Inventor.
Litfallah G. Sabbag
by Heard Smith & Dennant
Attys.

Patented Dec. 13, 1927.

1,652,375

UNITED STATES PATENT OFFICE.

LITFALLAH G. SABBAG, OF EAST BOSTON, MASSACHUSETTS, ASSIGNOR OF ONE-HALF TO MIKE A. TAWA, OF BOSTON, MASSACHUSETTS, AND ONE-HALF TO NASEEB GEORGE SABBAG, OF EAST BOSTON, MASSACHUSETTS.

MACHINE FOR AUTOMATICALLY ROLLING ARTICLES FROM BLANKS OF PLASTIC MATERIAL.

Application filed March 15, 1922, Serial No. 543,935. Renewed June 23, 1927.

This invention relates to machines for forming articles from blanks of plastic material by rolling the same into a predetermined form.

More particularly the invention comprises means for rolling an article of pastry, such as, a baked wafer or cake into a predetermined, preferably conical, form, the machine illustrating a selective embodiment of my invention disclosed herein being adapted for making pastry receptacles, such as, are known as ice cream cones. It will, however, be understood that the invention in its broader aspect comprises a machine for automatically rolling a blank of any suitable material into such predetermined form as may be produced by a machine of this character.

A further object of the invention is to provide means for automatically transferring blanks from a blank supplying means successively to the rolling or forming mechanism or other blank receiving mechanism.

A further object of the invention is to provide suitable means for adjusting the position of the transferring mechanism relatively to the blank supplying means and the rolling means so that such mechanism may be properly co-ordinated and also in such a manner that the device may be caused properly to operate upon blanks of different size or character.

A further object of the invention is to provide means for automatically positioning a plurality of rolling or forming members in co-operative relation and removing the same from such co-operative relation to permit the discharge of the formed article. Preferably means are provided for making suitable adjustments of the forming mechanism in order that they may be properly positioned in co-operative relation and also in order to enable the parts of such mechanism to be so positioned as to operate upon blanks of different size and character, such, for example, as making cones of different lengths.

A further object of the invention is to proivde a relatively simple mechanism for co-ordinating the movements of the transferring means to those of the rolling or forming means so that the blanks will be delivered to the rolling or forming members when they are in co-operative relation.

Another object of the invention is to provide means for automatically rotating the rolling or forming members when in co-operative relation and preferably permitting one of said members to cease its rotation when removed from co-operative relation to the other member.

A further object of the invention is to provide a novel transferring mechanism preferably comprising a pair of jaws which are opened as the transferring device is caused to approach the blank supplying means and which desirably is rotated during its retracting movement in such a manner as to present the blank properly to the rolling mechanism. Adjustable means also are provided for opening the jaws of the transferring mechanism during the retracting movement for the purpose of releasing the blank and permitting it to drop into the rolling mechanism.

Another feature of the invention consists in supporting one of the rotatable rolling or forming members upon a movable bracket which is oscillated to move the forming members into and out of co-operative relation, means being provided whereby the movement of said bracket also actuates the transferring mechanism so that proper co-ordination between the movements of the transferring mechanism and the movable member of the rolling mechanism is obtained.

A further object of the invention is to provide a guide for the blank adapted to co-operate with one of the rolling or forming members and to provide means for moving the same into and out of co-operative relation to said rolling or forming member in synchronism with like movements of the movable rolling or forming member. Desirably, suitable adjustments are provided for properly positioning the guide and such other members as co-operate with the rolling or forming member.

A further feature of the invention consists in providing a guard intermediate of the rotatable rolling or forming members for the purpose of insuring proper manipulation of the blank during the rolling or forming operation.

A further object of the invention is to provide means for automatically discharging the finished article from the rolling or forming members when said members are removed from co-operative relation.

Other objects and features of the invention will more fully appear from the following description and the accompanying drawings and will be pointed out in the claims.

A preferred embodiment of the invention is disclosed herein as applied to a machine for making pastry cones comprising a rotatable wheel or table carrying a series of baking irons or griddles with means for automatically transferring the blanks, such as, wafers or cakes, to a suitable rolling or forming mechanism and automatically discharging the completed article from the latter.

In the drawings:

Fig. 7 is a detail elevation of the transferring mechanism and blank presenting mechanism similar to that shown in Fig. 2 with the transferring mechanism in an intermediate position;

Fig. 8 is a similar view showing the transferring mechanism in the position in which it discharges the blank into the rolling and forming mechanism; and, Fig. 9 is a detail view showing the arm which discharges the completed article from the core and its relation to the surface or cam which retracts said arm.

A preferred embodiment of the invention is disclosed herein as applied to a machine for automatically producing "rolled cones" or other articles of pastry made from a baked blank in the form of a wafer or cake.

The transferring and rolling mechanisms are illustrated herein as applied to a usual type of baking machine upon which wafers or cakes are produced which are subsequently rolled in the form of cones or receptacles for ice cream and other materials. So far as I am aware no machine has heretofore been produced for automatically transferring a baked wafer, cake, or blank of other plastic material from a blank presenting mechanism and rolling the same into a predetermined form, and it is to be understood that the present invention, therefore, comprises broadly an automatic machine for automatically producing a finished article from a blank in the manner above set forth.

In the manufacture of "rolled cones" or other receptacles made from a wafer or cake, a rotatable wafer-making device has been provided comprising a series of plates, griddles or irons adapted to form and bake blanks. The blanks are then taken by the operator whilst in the freshly baked condition from the griddle or iron, wrapped around a core or former and permitted to cool. The material of the cake thus freshly formed is sufficiently plastic to enable the blank to be thus wrapped around the core or former without breaking the surface of the cake, and when allowed to cool, after being thus formed, remains permanently of the shape produced by this rolling operation.

The present invention comprises means for automatically forming rolled articles in a similar manner and the invention is disclosed herein as applied to a usual type of baking machine which is employed for baking wafers or cakes from which ice cream cones are made. As illustrated in the drawings the blank presenting mechanism is shown as a rotatable wheel having an annular rim 1 desirably provided with a flanged lower edge portion 2 having upon it gear teeth 3 by which it is driven. A series of webs or spokes 4 connect the rim 1 with the hub of the wheel (not shown). An internal web 5 is located at a distance from the rim 1 and preferably in parallelism therewith to provide sides of a chamber 6 in which heating burners are located for heating the baking plates or griddles.

The baking plates or griddles preferably comprise a plate 7 which is mounted in suitable trunnions 8 in the webs 1 and 5 and a co-operating cover plate 9 which is pivotally connected to the plate 7 by a hinge 10 and is provided at the opposite end with an extension or trunnion 11 which is engaged by a track 12 as the baking plates or griddles 7 and 9 approach the position in which the wafer or cake is to be removed. A track 13 preferably is provided to engage an extension of the trunnion 8 so that the separation of the baking plates or griddles is assured.

The machine thus described is one which has been commonly used and the baked wafers or cakes have heretofore been removed from the baking plates or griddles by hand and thereafter rolled by hand into the desired form. Any other suitable mechanism for forming a blank, whether a wafer, cake, or other form of blank, from suitable material may be provided as a blank presenting mechanism for the transferring and rolling mechanisms hereinafter to be described.

The present invention is addressed to the transferring mechanism which comprises means for removing the blank from the blank presenting mechanism, presenting the same to the rolling mechanism and after the blank has been formed discharging the finished article therefrom. In the preferred embodiment of the invention illustrated herein the transferring mechanism comprises a pair of reciprocating and rotating grippers which, during the advancing movement, engage the blank and during the retracting movement rotate sufficiently to present the blank in proper relation to the forming or rolling mechanism, and at or adjacent the end of the retracting movement discharge the blank so that it falls by gravity upon a suitable guide which delivers it to the forming rollers around one of which the blank is wrapped and upon which it is rolled until its form is definitely fixed. The finished article is thereafter discharged automatically.

The rolling or forming mechanism comprises a preferably conoidal roller 14 carried upon the end of a shaft 15 which is journalled in suitable bearings 16 and 17 preferably integral with a base or frame 18. The shaft 15 has upon it a beveled gear 19 which meshes with a complementary beveled gear 20 of larger diameter carried upon the end of a countershaft 21 which is driven from the main shaft of the machine, or other suitable mechanism, and is journalled in bearings in brackets 22 and 23 which are suitably supported upon the base 18 and desirably are adapted to be adjusted respectively by screws 24, 25, 26 and 27 which engage opposite sides of the brackets 22 and 23. The set screws 24 and 26 are respectively mounted in stands 28 and 29 integral with the base 18 and the set screws 25 and 27 are respectively mounted in a web 30 which is preferably integral with the base 1 and extends in parallelism with the stands 28 and 29.

By reason of this adjustment the proper relation between the beveled gears may be readily obtained.

In the particular embodiment of the invention disclosed herein the rotary member 14 forms the core member of the rolling or forming mechanism and revolves about a stationary axis. When employed for forming conical articles, such as, ice cream cones, this core member 31 is of conical form and desirably is provided with longitudinally extending grooves which converge toward the apex of the cone.

The co-operating forming member preferably comprises a rotatable cone 32 complementary to the core member 31 and is provided with a plurality of peripheral grooves 33 to receive the fingers of a guard which will hereinafter be more fully described. The rotary forming member 32 is integral with or mounted upon a shaft 34 which is journalled in a pivotally mounted bracket. The pivotally mounted bracket disclosed herein comprises a standard 35 having a journal for the shaft 34 of the rotary forming member and having an integral actuating arm 36 which will hereinafter be more fully described. The bracket also comprises an L-shaped arm or plate 37 which is secured at one end to the standard 35. The other member 38 of said L-shaped arm extends in parallelism with the standard 35 and is provided with a suitable journal for the shaft 34. The actuating arm 36, in the preferred embodiment of the invention disclosed herein, extends upwardly at an angle to the base and is provided with a wear plate 39 which is engaged by a cam 40 mounted upon a shaft 41 which is journalled in a suitable boss 42 in the web 30 and is actuated by a gear 43 which is driven by a gear 44 on the countershaft 21.

The standard 35 and member 38 of the bracket are pivotally mounted upon a stationary shaft 45 which is fixedly secured to suitable bosses 46 on the base 18.

Figure 1:
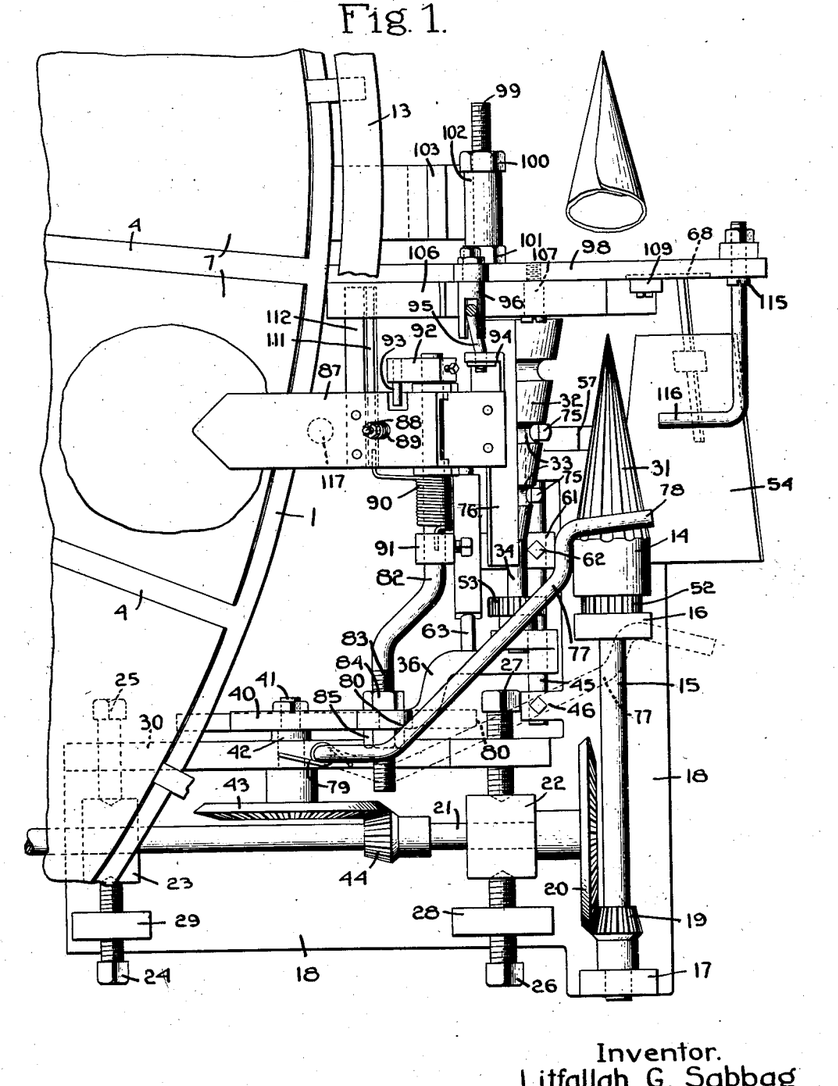
Fig. 1 is a plan view of a portion of a usual type of wafer or cake baking machine and the transferring and rolling or forming mechanism applied thereto; showing also a formed cone being discharged from the machine.
Figure 2:
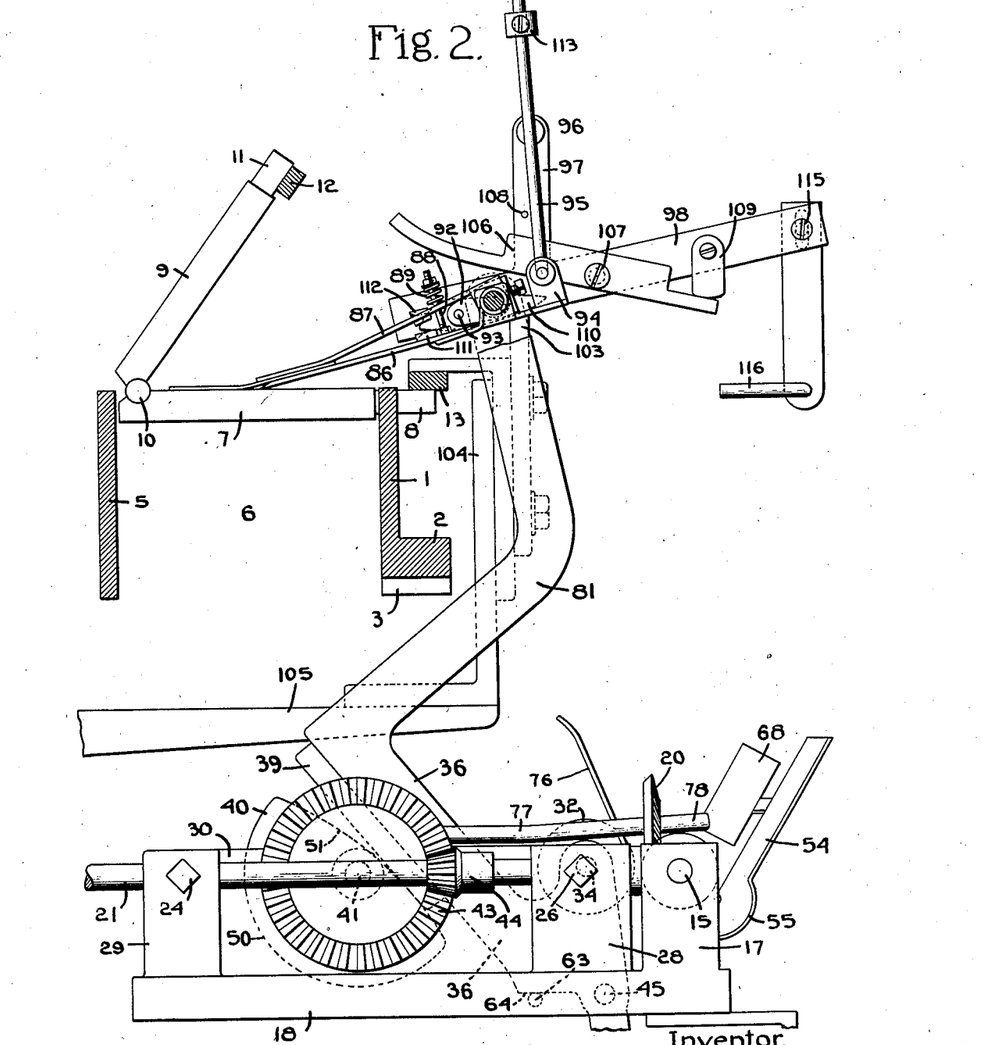
Fig. 2 is a detail end elevation showing the rolling mechanism and the transferring mechanism and illustrating certain portions of the transferring mechanism and the blank presenting mechanism in section.

A stud 47, extending downwardly from the arm or plate 37 of the bracket, is connected by a spring 48 to a suitable bracket 49 secured to the base 18. The spring 48 normally tends to swing the bracket which carries the forming roller 32 out of co-operative relation to the rotary core member 31. The cam 40 is provided with a concentric face 50 and an approximately flat face 51 as illustrated in Fig. 2 adapted respectively to actuate the lever 36 in such a manner as to permit the forming roller to be separated from the rotary core member by the action of the spring 48, as illustrated in Fig. 2, when the wear plate 39 of the arm 36 rests upon the substantially flat portion 51 of the cam, or to cause the forming roller to be forced into co-operative relation to the conical core member 31 by the cylindrical portion 50 of the cam when the later is revolved so that said cylindrical portion 50 engages the wear plate 39. Thus it will be observed the forming roller is moved alternately out of co-operative relation to the forming roller by the spring 48 and into co-operative relation to said rotary core member by the action of the cam face 50.

The shaft 15 of the rotary core member 31 is provided with a gear 52 which is adapted to engage a complementary gear 53 upon the shaft 34 of the rotary forming member when these members are in co-operative position. These gears, however, are separated when the rotary forming member 32 is moved from said co-operative position.

Figures 3, 4, 5, 6:
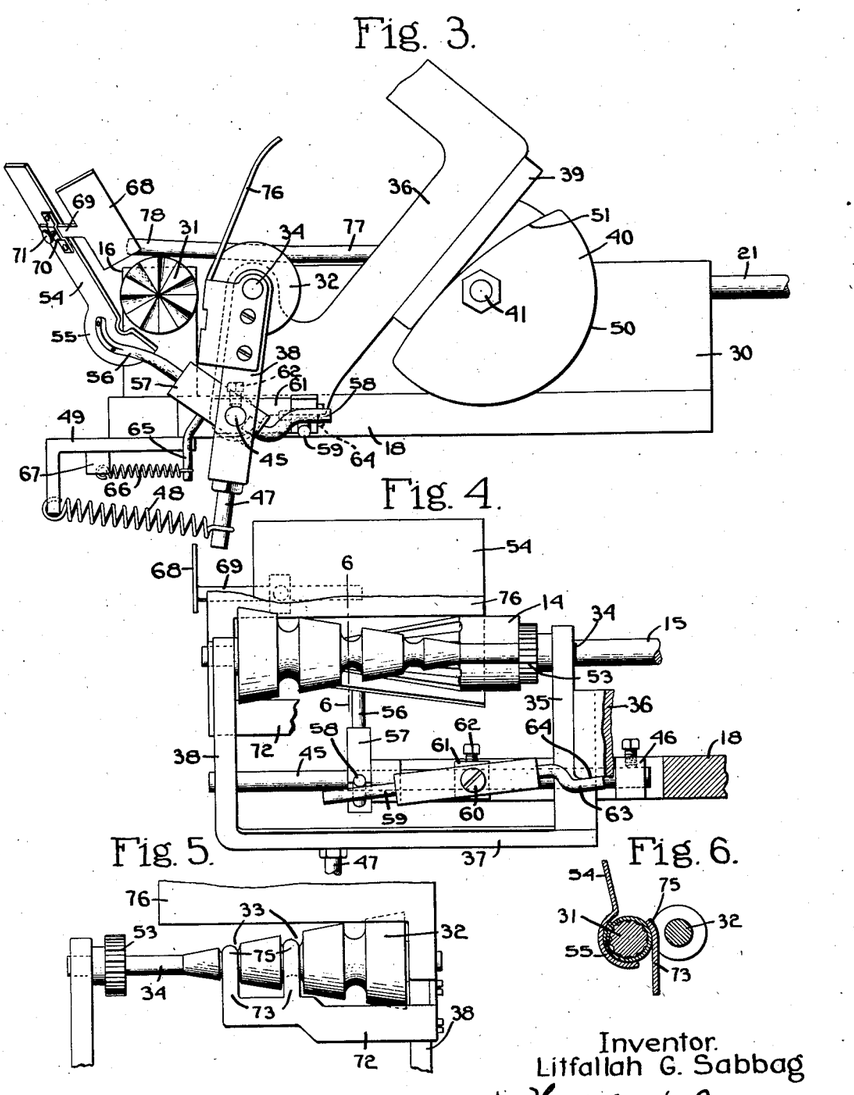
Fig. 3 is a detail end elevation of the rolling mechanism and certain associated parts.
Fig. 4 is a side elevation of a part of the mechanism illustrated in Fig. 3, viewed from the left toward the right.
Fig. 5 is a detail side elevation of the movable forming roller and the guard which is associated therewith.
Fig. 6 is a vertical sectional view through the rotating rolling and forming members and the guide and guard on line 6—6 Fig. 3.

Suitable means are provided for presenting the blank, such as, a baked wafer or cake, to the conical core member at predetermined times, preferably when the rotary core and forming members are in co-operative relation. Any suitable means may be provided for thus presenting the blank to the rotary core member. As illustrated herein it is accomplished by a guide 54 having a concaved portion 55 which is substantially complementary to a part or the whole of the conical forming surface of the core member 31. The guide 54 is carried by an arm 56 which may, if desired, be adjustably mounted in a block 57 which is pivotally mounted upon the stationary shaft 45. A curved arm 58, rigidly connected to the opposite end of said block 57 from that to which the arm 56 is connected, extends over and into the path of the end of a lever 59 which is pivotally mounted upon a stud 60 which is seated in a block 61 which is fixedly secured by a set screw 62 to the stationary shaft 45. The opposite end of the shaft 59 is provided with an offset portion 63 which extends beneath a shoulder 64 upon the arm 36 of the bracket which supports the rotatable forming member 32. An arm 65, secured to the block 57, is engaged by a spring 66 connected to a boss 67 on the stationary bracket 49. By reason of this construction the spring 66, acting through the arm 65, normally tends to swing the guard 54 into co-operative relation to the conical core member 31 so that during the formation of the blank by the co-operating rotary forming members the guard is held yieldably in co-operative relation to the conical core member 31. When, however, the cam 40 is so rotated that the spring 48, which acts upon the bracket carrying the rotatable forming member, swings it away from co-operative relation to the core member to the positions illustrated in Figs. 2 and 3, the shoulder 64 of the arm 36 raises the arm 58 of the lever, which supports the guard 54, and depresses the guard away from co-operative relation to the forming roller 31 into the position illustrated in Figs. 2 and 3. Desirably an end guide 68 is provided to insure the guiding of the blank properly to the rotary core member 31. This end guide 68 is in the form of a plate having an arm 69 which is adjustably mounted in a keeper 70 and is secured therein by a set screw 71.

When the guard 54 is in co-operative relation to the rotary conical member 51 a blank dropped upon it will be presented to the grooved rotating surface of the rotary core member 31 and engaging such surface will be carried between the convex surface of the core member 31 and the concaved surface of the guide and progressively wrapped about the conical core member until it comes into engagement with the surface of the rotating forming member 32. In order properly to prevent the blank from sticking to the rotary forming member 32 and also to insure the wrapping of the blank about the core member a guard is provided which extends between and beyond the co-operating portions of the surfaces of the rotary core member 31 and rotary forming member 32. The preferred form of guard which is illustrated herein comprises a plate 72 which is secured to the arm 38 of the bracket which supports the rotatable forming member, said plate being provided with upwardly extending arms 73 which lie within suitable grooves 74 in the rotatable forming member 32. The upper ends 75 of the arms 73 are curved away from the forming roller 32 and desirably conform substantially to the curvature of the periphery of the conical core member 31. An additional plate or guide 76 may also be provided, if desirable, to insure the guidance of the blank to the rotating core member 31.

Suitable means are provided for discharging the finished article from the core member 31 when the rotary forming member and the guide 54 are swung away from cooperative relation to said core member. As illustrated herein this is accomplished by an arm 77 having an offset end 78 located in juxtaposition to the conical core member 31 and operated by the movement of the bracket which supports the rotatable forming member. The arm 77 is provided with an offset end which is journaled in the web 30 of the base. A helical spring 79, anchored at one end to the web 30 and surrounding the vertical offset end of the arm 77 and engaging the arm 77, normally tends to force the arm in a direction to discharge the completed article from the core member. This arm, however, is engaged by a cam 80 upon the arm 36 and retracted against the action of the spring 79 when the bracket, which carries the rotatable forming member 32 is moved toward co-operative position. When, however, the rotatable forming member is moved away from co-operative relation to the core member 31, after the completion of the article, the cam 80 permits the lever 77 to swing under the influence of the spring in a direction to discharge the completed article from the core member.

Suitable means are provided for transferring the blank, wafer or cake from the presenting mechanism or baking mechanism to the forming mechanism in properly timed relation to the movements of the rotatable forming member 32 and guide 54. As illustrated herein the transferring mechanism is carried by an offset extension 81 of the arm 36. The transferring mechanism comprises a shaft or rod 82 having a screw threaded offset end 83 which passes through a suitable aperture in the upper end of the extension 81 and is adjustably secured thereupon by nuts 84 and 85 clamped upon opposite sides of the upper end of the arm extension 81. By reason of this attachment, the rod 82 may be adjusted longitudinally, or by being rotated about the axis of the offset end portion 83, before the clamping nuts 84 and 85 are set up, may be rotatably adjusted in such a manner as to properly position the gripping members of the transferring mechanism in relation to the blank presenting means. A suitable blank-gripping mechanism is rotatably mounted upon the arm 82. As illustrated herein the gripping mechanism comprises upper and lower jaw members, the lower jaw member 86 being provided with suitable upwardly extending ears which are rotatably mounted upon the rod 82. The co-operating jaw member 87 is likewise provided with suitable ears which are mounted upon the rod 82. A bolt 88, anchored in the lower jaw member 86 and passing through the upper member 87, is provided with a spring 89 which normally tends to close the jaw members. A helical spring 90, mounted upon the rod 82 and having one end secured to a block 91 which is fastened to the rod 82 and the other end engaging the lower jaw member 86, normally tends to raise the jaw members. A keeper 92, having an arm 93 extending over the lower jaw member, serves to limit the movement of the jaw member in the opposite direction. The upper jaw member is provided with a suitable recess through which the member 93 may pass. The lower jaw member extends beyond the rod 82 and has connected to its end a bracket 94 which is pivotally connected to a rod 95 which extends upwardly through a slotted boss 96 which is secured to a bracket 97 which extends upwardly from a bar 98 having a laterally extending screw threaded post 99 which is adjustably secured by nuts 100 and 101 in a cylindrical boss 102 at the upper end of a bracket 103 which is secured to a suitable supporting bracket 104 carried by a frame member 105 which may be a portion of the frame of the baking machine. By reason of the connection of the bar 98 to the boss 102 of the bracket 103 the bar may be adjusted longitudinally in respect to the rotary forming mechanism just as the rod 82 may be similarly adjusted longitudinally in respect to the forming mechanism by adjustment of the nuts 84 and 85 so that the transferring mechanism may be properly positioned to deliver articles of different sizes from the blank supplying means to the forming mechanism.

A shoe 106, which is pivotally secured to the bar 98 by a stud or screw 107, serves to guide the transferring mechanism during its oscillating movement. A pin 108 upon the bracket 97 serves to limit the upward movement of one end of the shoe 106 while a depending abutment 109 acts to limit its movement in the opposite direction.

The bar 98 is provided with a wedge-shaped cam 110 which is pointed at both ends, and the upper and lower jaw members are respectively provided with arms 111 and 112 which are adapted to engage the opposite faces of the cam 110 during the forward movement of the jaw members toward the gripping position illustrated in Fig. 2.

Figures 7, 8, 9:
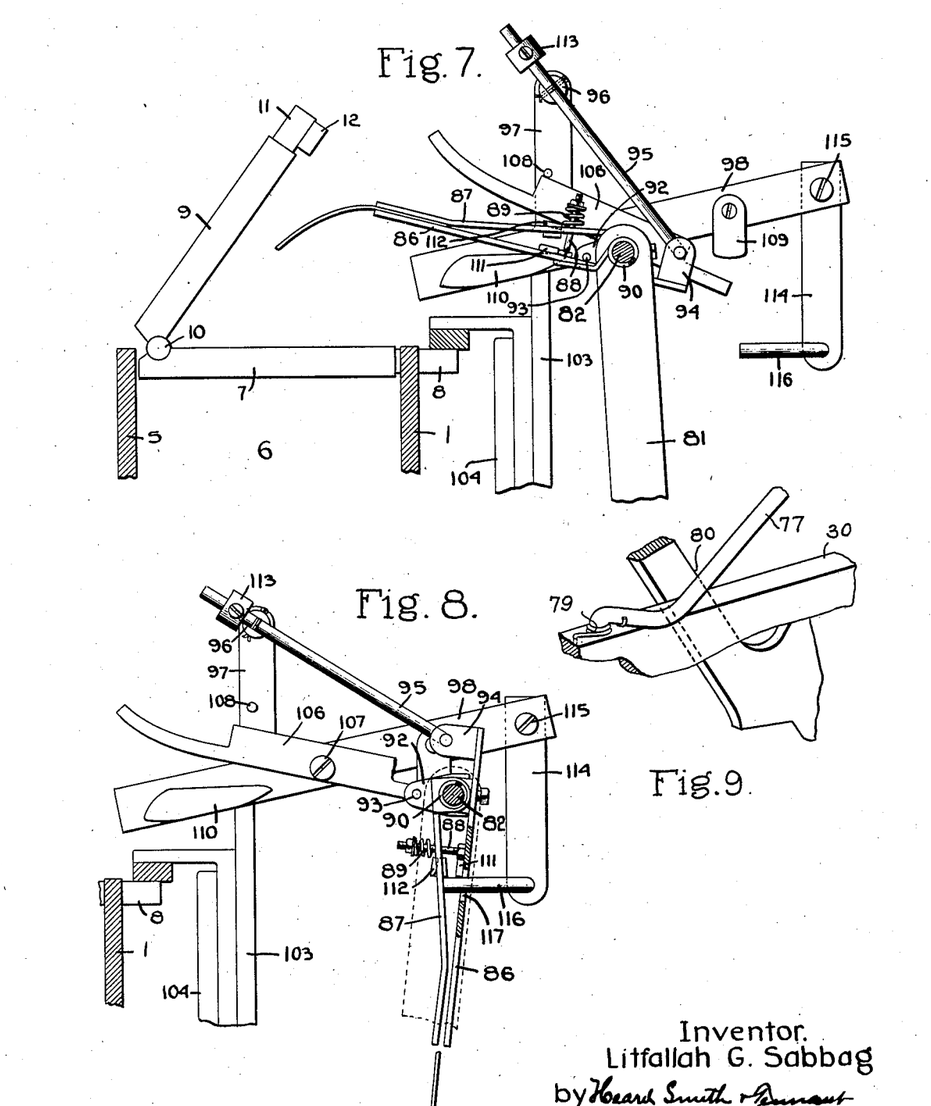

In the operation of the machine the arm 36 of the bracket, which supports the rotatable forming member, is oscillated in the manner heretofore described. During its movement toward the position illustrated in Fig. 2 the arms 111 and 112 of the jaw members engage opposite sides of the cam 110, which is stationary, and are spread apart so that the lower jaw member, which has a beveled end, is forced into engagement with the plate upon which the blank, wafer or cake rests, and the upper jaw member 87 is raised so as to pass over the blank. At the end of the forward movement the arms 111 and 112 of the jaws 86 and 87 pass beyond the end of the cam 110 and the spring 89, acting upon the upper jaw 87, closes it down upon the blank. When the arm 111 thus passes from engagement with the under face of the cam 110 the helical spring 90 raises the gripping jaws and strips the blank from the blank presenting mechanism. During the movement of the arm 36 and its extension 81 in the opposite direction, which may be termed the "retracting movement", the arms 111 and 112 pass over the top of the cam 110 as the spring 90 at this time holds them in elevated position. As the arm swings further in its retracting movement the rod 95 slides downwardly through the slotted boss 96 until an adjustable stop 113 upon said rod comes into contact with the boss 96. Further retracting movement of the arm 36 and extension 81, after the stop 113 has engaged the stud 96, causes the jaw members of the transferring mechanism to be swung about the rod 82 toward the position shown in Fig. 8, the jaw members at this time still grasping the blank.

Any suitable means may be provided for causing the blank to be released from the jaw members. As illustrated herein a bracket 114 is adjustably connected by a clamping bolt 115 to the plate 98 and is provided at its lower end with an arm 116 which is adapted to pass through a suitable aperture 117 in the lower jaw member and to engage the upper jaw member 87 just before the end of the retracting movement and to press upon the same sufficiently to separate the jaw members and drop the blank upon the guide 54 which presents the blank to the rotatable core member.

The operation of the invention as applied to a "rolled cone making machine" may be briefly described as follows:—

The batter is poured upon the successive baking plates 8 and 9 by any suitable mechanism as the wheel, which supports the baking plates, is intermittently revolved. Where a pair of baking plates 8 and 9 are employed suitable means are provided for turning the baking plates over so that the heat is applied first to one and then to the other during the progress of the plates from charging position to discharging position. As the plates approach discharging position the track 12 engages the under face of the extension or trunnion of the upper plate 9 and raises the same into the position illustrated in Fig. 2. This is the usual operation of a baking machine for "hand rolled cones" above described. In the present invention the mechanism for actuating the forming rollers and transferring mechanism is so operated that as the baking plates progressively approach the discharging position illustrated herein the forming roller 32 is swung away from the rotatable core member 31, the arm 36 being moved toward the direction illustrated in Fig. 2. During this movement the arms 111 and 112 of the jaw members engage opposite sides of the cam 103 so that the jaws 86 and 87 are opened and the lower jaw caused to slide along upon the baking plate beneath the wafer or cake which has been freshly baked thereupon. As the arms 111 and 112 pass over the end of the cam 110, the spring 89 closes the jaw 87 down upon the upper face of the cake. The spring 90 thereupon swings the jaws, with the cake grasped therebetween, upwardly, until the upper arm 112 engages the under face of the shoe 106 which it raises until the shoe engages the stud 109. During further movement in the same direction the arm 112 engages the under side of the shoe 106 until it passes beneath the pivot 107 of the shoe, at about which time the rod 95 has been drawn downwardly through the stud 96 until the stop 113 engages said stud 96, whereupon further movement of the transferring mechanism in the same direction will cause the jaws to be swung about the rod 32 as an axis to the delivery position illustrated in Fig. 8. Just before the end of the movement in this direction the jaws are swung sufficiently to cause the arm 116 to pass through the lower jaw and engage the upper jaw 87 and separate it sufficiently from the lower jaw to permit the blank or cake to drop upon the guide 54.

It will be noted that during this lateral swinging or retracting movement of the transferring mechanism the bracket, which supports the rotary forming roll 32, will have been moved in such a manner as to position the forming roller 32 in co-operative relation to the rotatable core member 31 and also to position the guide 54 in co-operative relation to said roller. The blank or cake, which is released from the gripping members is, therefore, dropped upon the guide 54 and if by chance it should so fall that it would tend to pass beyond the end of the conical core member it would be engaged by the end guide 68 and be directed properly thereby on to the guide 54. As the blank or cake slides down the guide 54 it is engaged by the grooved surface 31 of the conical forming member and carried along between the same and the concaved portion 55 of the guide. This concaved portion of the guide serves to press the blank or cake firmly, but yieldingly, against the rotating forming member 31 so that it is wrapped around the same and carried between the rotating core member and the rotating forming member 32 which presses it more firmly upon the core member and also serves to press together overlapping parts of the blank or cake.

At this time the cake is in a heated and more or less plastic condition so that the pressure thus produced by the forming roller upon it serves to cause the overlapping parts to adhere firmly together. Preferably the mechanism is so timed that the rotating core and forming rollers will make several revolutions while the cake is thus retained upon them giving sufficient time for the cake to cool and harden.

The guard arms, which extend upwardly through the grooves 33 in the forming roller 32, serve to prevent the stripping of the cake from the forming roller and also to properly guide it around the rotary core member. The cake is fully formed in this manner while the cylindrical face 50 of the cam 40 holds the rotary forming member in co-operative relation to the core member. When, however, the cam 40 is rotated so that the relatively flat portion thereof engages the arm 36, the spring 48 acts upon the bracket which carries the rotary forming member to remove said forming member from co-operative relation to the rotary core member and at the same time depresses the guide away from its co-operative relation to the rotary core member. As the rotary forming member and guide are thus removed from co-operative relation to the rotary core member the arm 77 is released and advances in such a manner as to engage the formed article and discharge it from the rotary core member into a receptacle or upon a suitable conveyor (not shown) of the character customarily employed in connection with automatic machines of this character.

The various adjustments hereinbefore described provide means for so positioning the elements of the transferring mechanism and forming mechanism that cones or pastry articles of any desired size may be properly manipulated and formed upon the mechanism herein described.

It will be understood that the embodiment of the invention disclosed herein is of an illustrative character and is not restrictive and that various changes in form, construction and arrangement of parts may be made within the spirit and scope of the following claims.

Having thus described my invention, what I claim as new, and desire to secure by Letters Patent, is:

1. A machine for forming articles from plastic material comprising means for supplying blanks of said plastic material, means including a core member and a roller co-operating therewith for rolling said blanks into a predetermined form and means for automatically transferring a blank from said blank supplying means to said rolling means.

2. A machine for forming articles from plastic material comprising means for supplying blanks of said plastic material, means including a core member and a complementary roller co-operating therewith for rolling said blanks into a predetermined form, means for automatically transferring a blank from said blank supplying means to said rolling means and means for adjusting said transferring means relatively to said supplying means.

3. A machine for forming articles from plastic material comprising means for supplying blanks of said plastic material, means including a core member and a complementary roller co-operating therewith for rolling said blanks into a predetermined form, means for automatically transferring a blank from said blank supplying means to said rolling means and automatically operable means for discharging the formed article from said rolling means.

4. A machine for forming articles from plastic material comprising means for supplying blanks of said plastic material, means including a core member and a complementary roller co-operating therewith for rolling said blanks into a predetermined form, a movable transferring instrumentality and means for automatically actuating the same to engage said blank and to deliver the same to said rolling means.

5. A machine for forming articles from plastic material comprising means for supplying blanks of said plastic material, means for rolling said blanks into a predetermined form, a transferring instrumentality having jaws for gripping said blank, means for advancing and retracting said transferring instrumentality, means for automatically opening said jaws during the advancing movement, means for closing said jaws upon said blank, means operable during the retracting movement to present said blank to said rolling means and means for releasing the blank from said transferring instrumentality.

6. A machine for forming articles from plastic material comprising means for supplying blanks of said plastic material, means for rolling said blanks into a predetermined form, a transferring instrumentality having spring-actuated jaws to grip said blank, means for advancing and retracting said transferring instrumentality, means for automatically opening said jaws during the advancing movement, means for rotating said transferring instrumentality during the retracting movement to present the blank to said rolling means and means for opening said jaws to deliver said blank to said rolling means.

7. A machine for forming articles from plastic material comprising means for supplying blanks of said plastic material, means for rolling said blanks into a predetermined form, a transferring instrumentality having a rigid jaw and a spring-actuated relatively movable jaw, means for advancing and retracting said transferring instrumentality, a cam positioned to open said jaws during the forward movement of said transferring instrumentality, means for rotating said transferring instrumentality during the retracting movement thereof to present the blank to said rolling means and means for engaging said movable jaw during said retracting movement to open the same when the blank is presented to said rolling means.

8. A machine for forming articles from plastic material comprising means for supplying blanks of said plastic material, means for rolling said blanks into a predetermined form, a transferring instrumentality having co-operating spring-actuated jaws to grip said blank, means for rotatably adjusting said jaws to position the same with relation to said blank supplying means, means for advancing and retracting said transferring instrumentality, means for opening said jaws during the advancing movement, means for rotating said transferring instrumentality during the retracting movement to present the blank to said rolling means and means for discharging the blank from said jaws when presented to said rolling means.

9. A machine for forming articles from plastic material comprising means for supplying blanks of said plastic material, means for rolling said blanks into a predetermined form, a transferring instrumentality having co-operating spring-actuated jaws to grip said blank, means for adjusting said transferring means toward or away from said blank supplying means, means for advancing and retracting said transferring instrumentality, means for opening said jaws during the advancing movement, means for rotating said transferring instrumentality during the retracting movement to present the blank to the rolling means and means for discharging said blank from said jaws when presented to said rolling means.

10. A machine for forming hollow articles from blanks of plastic material comprising a rotatable core member and a relatively movable rotatable forming member, means for moving said members into and out of co-operative relation and means for causing simultaneous rotation of said members when in co-operative relation.

11. A machine for forming hollow articles from blanks of plastic material comprising a rotatable core member and a co-operating relatively movable rotatable forming member, means for moving said members into and out of co-operative relation, means for causing simultaneous rotation of said members when in co-operative relation and means automatically operable when said members are removed from co-operative relation to discharge the formed article.

12. A machine for forming hollow articles from blanks of plastic material comprising a core member upon which the article is formed rotatable about a stationary axis, a co-operating rotatable forming member, means for moving the latter toward and away from said core member and means for rotating said members when in co-operative relation.

13. A machine for forming hollow articles from blanks of plastic material comprising a core member upon which the article is formed rotatable about a stationary axis, a co-operating rotatable forming member, means for moving the latter toward and away from said core member, means for rotating said core member continuously and means for imparting rotation to said forming member when in co-operative relation to said core member.

14. A machine for forming articles from blanks of plastic material comprising a core member rotatable about a stationary axis, a co-operating rotatable forming member, means for moving the latter toward and away from said core member, means for rotating said core member continuously and means for imparting rotation to said forming member when in co-operative relation to said core member comprising gears carried by said rotating members respectively adapted alternatively to engage and disengage when said members are moved into and out of co-operative relation.

15. A machine for forming hollow articles from blanks of plastic material comprising a core member upon which the article is formed rotatable about a stationary axis, a co-operating rotatable forming member, a pivotally mounted bracket supporting said rotatable forming member, means for swinging said forming member into and out of co-operative relation to said rotatable core member and automatically operable means for rotating said forming member when in co-operative relation to said core member.

16. A machine for forming articles from blanks of plastic material comprising a core member rotatable about a stationary axis, a co-operating rotatable forming member, means for moving the latter toward and away from said core member, means for rotating said members when in co-operative relation, guiding means for said blank located adjacent to said movable forming member, means for moving said guiding member into juxtaposition to said forming member when the latter is in co-operative relation to said core member and for moving said guiding member away from said forming member when the latter is moved away from co-operative relation to said core member.

17. A machine for forming articles from blanks of plastic material comprising a core member rotatable about a stationary axis, a co-operating rotatable forming member, means for moving the latter toward and away from said core member, means for rotating said members when in co-operative relation, guiding means for said blank located adjacent to said movable forming member, means for moving said guiding member into juxtaposition to said forming member when the latter is in co-operative relation to said core member and for moving said guiding member away from said forming member when the latter is moved away from co-operative relation to said core member and a guard co-operating with said core member acting to insure conformation of said blank to said core member.

18. A machine for forming articles from blanks of plastic material comprising a core member rotatable about a stationary axis, a co-operating rotatable forming member, means for moving the latter toward and away from said core member, means for rotating said members when in co-operative relation, guiding means for said blank located adjacent to said movable forming member, means for moving said guiding member into juxtaposition to said forming member when the latter is in co-operative relation to said core member and for moving said guiding member away from said forming member when the latter is moved away from co-operative relation to said core member, means for discharging the formed article from said core member, means for actuating the same when the forming member and guide are removed from co-operative relation to said rotatable members.

19. A machine for forming hollow articles from blanks of plastic material comprising a rotatable core member upon which the article is formed, a relatively movable rotatable forming member, means for moving said members into and out of co-operative relation, blank supplying means and means automatically operable in synchronism with the movement of said rotatable core and forming members to transfer a blank from said supplying means to said rotatable member.

20. A machine for forming articles from blanks of plastic material comprising a core member rotatable about a stationary axis, a co-operating rotatable forming member, a bracket supporting said rotatable forming member, means for moving said bracket to position said forming member into and out of co-operative relation to said core member, blank supplying means, means for transferring a blank from said blank supplying means to said co-operating core and forming members automatically operable by the movements of said bracket.

21. A machine for forming articles from blanks of plastic material comprising a core member rotatable about a stationary axis, a co-operating forming member, a pivotally mounted bracket supporting said rotatable forming member and having an upwardly extending arm, blank supplying means, transferring means carried by said arm having means to engage a blank, means for actuating said arm to move said forming member into and out of co-operative relation to said core member and means operable by the movement of said arm to cause said transferring means to remove a blank from said blank supplying means and deliver the same to said core and forming means when the latter are in co-operative relation.

22. A machine for forming articles from blanks of plastic material comprising a core member rotatable about a stationary axis, a co-operating forming member, a pivotally mounted bracket supporting said rotatable forming member and having an upwardly extending arm, blank supplying means, transferring means carried by said arm having means to engage a blank, means for actuating said arm to move said forming member into and out of co-operative relation to said core member, means operable by the movement of said arm to cause said transferring means to remove a blank from said blank supplying means and deliver the same to said core and forming means when the latter are in co-operative relation and means operable by the movement of said arm for discharging the finished article from said core member when said forming member is moved out of co-operative relation to said core member.

23. A machine for forming rolled cones comprising means for progressively baking a series of cakes, means including a core and a rotatable roll movable relatively thereto for rolling the cakes into a predetermined form, transferring mechanism actuated in timed relation to said baking and rolling means for delivering the baked cakes to said rolling means.

24. A machine for forming rolled cones comprising means for progressively baking a series of cakes, means including a core and a rotatable roll movable relatively thereto for rolling the cakes into a predetermined form, transferring mechanism actuated in timed relation to said baking and rolling means for delivering the baked cakes to said rolling means and means for automatically discharging the rolled cones from the rolling mechanism.

25. A machine for forming rolled cones comprising means for progressively baking a series of cakes, means for rolling the cakes into a predetermined form, a transferring instrumentality having a pair of jaws to grasp said cake, means for advancing and retracting said transferring instrumentality, means for opening said jaws during the advancing movement, means for closing said jaws upon said cake, means operable during the retracting movement of said transferring instrumentality to deliver said cake to said rolling means, a guide for receiving said cake and presenting the same to said rolling means and means for discharging the finished cone from said rolling means.

26. A machine for forming rolled cones comprising means for progressively baking a series of cakes, means for rolling said cakes into a predetermined form comprising a core member rotatable about a stationary axis, a co-operating rotatable forming member, means for moving the latter toward and away from said core member, means for guiding the cake to said rotatable core member and means for transferring the cake from said baking means to said forming member in synchronism with the movements of said baking member and said movable forming member.

27. A machine for forming hollow articles from plastic material comprising travelling means for supplying blanks of said plastic material, article-forming means including a rotatable core member, a co-operating forming member rotatable about a different axis from that of the core member and means for moving one of said forming members relatively to the other into and out of co-operative blank-engaging relation and reciprocating means for automatically transferring successive blanks to said article-forming means.

28. A machine for forming hollow articles from plastic material comprising travelling means for supplying blanks of said plastic material, article-forming means including a continuously rotatable core member, a co-operating forming member intermittently rotatable about a different axis from that of the core member and means for moving one of said forming members relatively to the other into and out of co-operative blank-engaging relation and reciprocating means for automatically transferring successive blanks to said article-forming means.

29. A machine for forming rolled cones comprising travelling means for baking a series of unconnected flat cakes, cone-forming means including a rotatable core member, a co-operating forming member rotatable about a different axis from that of the core member, means for moving one of said forming members relatively to the other into and out of co-operative cake-engaging relation and reciprocating means for automatically transferring successive cakes to the cone-forming members.

30. A machine for forming rolled cones comprising travelling means for baking a series of unconnected flat cakes, cone-forming means including a rotatable core member, a co-operating forming member rotatable about a different axis from that of the core member, means for moving one of said forming members relatively to the other into and out of co-operative cake-engaging relation and reciprocable and rotatable transferring means comprising jaws for gripping the blank means for advancing and retracting said jaws, means for opening the jaws during the advancing movement, means for closing the jaws upon the cake and means operable during the retracting and rotatable movement to release said cake and deliver it to the cone-forming means.

31. Transferring mechanism for removing and delivering flat articles from a travelling batter-baking machine to an article-receiving means comprising jaws for gripping the baked articles, means for advancing and retracting said jaws in synchronism with the movement of the travelling baking machine, means for automatically opening the jaws during the advancing movement, means for closing the jaws upon said article, means operable during the retracting movement of said jaws to open said jaws whereby the article will be delivered to the receiving means.

32. Transferring mechanism for removing and delivering flat articles from a travelling batter-baking machine to an article-receiving means comprising jaws for gripping the baked articles, means for advancing and retracting said jaws in synchronism with the movement of the travelling baking machine, means for rotating said jaws during the retractive movement thereof and means for opening said jaws during said rotative movement to deliver the article to the receiving means.

33. Transferring mechanism for removing and delivering flat articles from a travelling batter-baking machine to an article-receiving means comprising a rigid jaw and a relatively movable spring actuated jaw, means for advancing and retracting said jaws, means for automatically opening said jaws during the advancing movement, means for rotating said jaws during the retracting movement and a fixed abutment positioned to engage the movable jaw during said rotative movement whereby the jaws will be opened and the article delivered to the receiving means.

In testimony whereof, I have signed my name to this specification.

LITFALLAH G. SABBAG.